United States Patent
Patel

(10) Patent No.: US 8,298,996 B2
(45) Date of Patent: Oct. 30, 2012

(54) LOW TOXICITY SHALE HYDRATION INHIBITION AGENT AND METHOD OF USE

(75) Inventor: Arvind D. Patel, Sugar Land, TX (US)

(73) Assignee: M-I L.L.C., Houston, TX (US)

( * ) Notice: Subject to any disclaimer, the term of this patent is extended or adjusted under 35 U.S.C. 154(b) by 0 days.

(21) Appl. No.: 13/082,973

(22) Filed: Apr. 8, 2011

(65) Prior Publication Data

US 2011/0190171 A1  Aug. 4, 2011

Related U.S. Application Data

(63) Continuation of application No. 12/041,364, filed on Mar. 3, 2008, now Pat. No. 7,939,473.

(60) Provisional application No. 60/894,645, filed on Mar. 13, 2007, provisional application No. 60/940,851, filed on May 30, 2007.

(51) Int. Cl.
C09K 8/528 (2006.01)

(52) U.S. Cl. .......... 507/244; 507/90; 507/236; 507/238; 507/240; 507/246; 507/247; 507/256; 507/258; 507/261; 507/266; 507/269; 507/271

(58) Field of Classification Search .................. None
See application file for complete search history.

(56) References Cited

U.S. PATENT DOCUMENTS

| | | | |
|---|---|---|---|
| 3,996,135 A | 12/1976 | Stanford et al. | |
| 4,066,398 A | 1/1978 | Hwa | |
| 4,257,902 A | 3/1981 | Singer | |
| 4,536,305 A | 8/1985 | Borchardt et al. | |
| 4,813,482 A | 3/1989 | Walton | |
| 5,089,151 A | 2/1992 | Hall et al. | |
| 5,097,904 A | 3/1992 | Himes et al. | |
| 5,197,544 A | 3/1993 | Himes et al. | |
| 5,424,284 A | 6/1995 | Patel et al. | |
| 5,887,653 A | 3/1999 | Bishop et al. | |
| 5,908,814 A | 6/1999 | Patel et al. | |
| 2004/0204323 A1 | 10/2004 | Temple et al. | |
| 2005/0049150 A1 | 3/2005 | Patel et al. | |
| 2006/0189826 A1 | 8/2006 | Band et al. | |

OTHER PUBLICATIONS

International Search Report and Written Opinion, mailed Aug. 8, 2008, for PCT/US2008/055657.

Primary Examiner — John J Figueroa

(57) ABSTRACT

A low toxicity composition and method of reducing the swelling of clay in well comprising circulating in the well a water-based fluid comprising a functionally effective concentration of the additive formed from the following reaction of a tertiary amine of the following general formula:

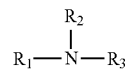

wherein $R_1$ and $R_2$ are alkyl or hydroxyalkyl groups with one to three carbon atoms or combinations thereof, and $R_3$ is a hydroxyalkyl group with one to three carbon atoms, with an alkylating agent of the following general formula:

R-A wherein R is an alkyl radical with one to three carbon atoms, and A is an organic or inorganic anion selected from the group consisting of sulfate, phosphate, carbonate, and combinations thereof.

11 Claims, No Drawings

LOW TOXICITY SHALE HYDRATION INHIBITION AGENT AND METHOD OF USE

CROSS REFERENCE TO RELATED APPLICATIONS

This application is a continuation of U.S. application Ser. No. 12/041,364, filed Mar. 3, 2008, which claims priority under 35 U.S.C. §119(e), to U.S. Patent Application No. 60/894,645, filed on Mar. 13, 2007, and U.S. Patent Application No. 60/940,851, filed on May 30, 2007, all of which are herein incorporated by reference in their entirety.

The invention relates to drilling fluid additives which suppress clay swelling within a subterranean well during the drilling process. The invention is particularly directed to a composition and method for reducing the toxicity of hydration inhibiting additives for drilling fluids comprising hydroxyalkyl quaternary ammonium compounds.

BACKGROUND

In rotary drilling of subterranean wells numerous functions and characteristics are expected of a drilling fluid. A drilling fluid should circulate throughout the well and carry cuttings from beneath the bit, transport the cuttings up the annulus, and allow their separation at the surface. At the same time, the drilling fluid is expected to cool and clean the drill bit, reduce friction between the drill string and the sides of the hole, and maintain stability in the borehole's uncased sections. The drilling fluid should also form a thin, low-permeability filter cake that seals openings in formations penetrated by the bit and act to reduce the unwanted influx of formation fluids from permeable rocks.

Drilling fluids are typically classified according to their base material or primary continuous phase. Due to environmental concerns, focus has increased on water-based fluids. Three types of solids are usually found in water-base drilling fluids: (1) clays and organic colloids added to provide necessary viscosity and filtration properties, (2) heavy minerals whose function is to increase the drilling fluid's density, and (3) formation solids that become dispersed in the drilling fluid during the drilling operation.

The formation solids that become dispersed in a drilling fluid are typically the cuttings produced by the drill bit's action and the solids produced by borehole instability. Where the formation solids are clay minerals that swell, the presence of such solids in the drilling fluid can greatly increase drilling time and costs. The overall increase in bulk volume accompanying clay swelling impedes removal of cuttings from beneath the drill bit, increases friction between the drill string and the sides of the borehole, and inhibits formation of the thin filter cake that seals formations. Clay swelling can also create other drilling problems such as loss of circulation or pipe sticking that can slow drilling and increase the drilling costs.

Clay swelling is a phenomenon in which water molecules surround a clay crystal structure and position themselves to increase the structure's c-spacing. Two types of swelling can occur. Examples of clay swelling include surface hydration and osmotic swelling.

Surface hydration is a type of swelling in which water molecules are adsorbed on crystal surfaces. Hydrogen bonding holds a layer of water molecules to the oxygen atoms exposed on the crystal surfaces. Subsequent layers of water molecules then line up to form a quasi-crystalline structure between unit layers which results in an increased c-spacing. All types of clays swell in this manner.

Osmotic swelling is a type of swelling where the concentration of cations between unit layers in a clay mineral is higher than the cation concentration in the surrounding water, water is drawn between the unit layers and the c-spacing is increased. Osmotic swelling results in larger overall volume increases than surface hydration. However, only certain clays, like sodium montmorillonite, swell in this manner.

Although a number of compounds are known for their effectiveness in inhibiting reactive shale formations, several factors affect the practicality of using swelling inhibitor additives in drilling fluids. First, the inhibitor must be compatible with the other drilling fluid components. The driller of subterranean wells must be able to control the rheological properties of drilling fluids by using additives such as bentonite, anionic polymers and weighting agents. Thus, drilling fluid additives should also provide desirable results but should not inhibit the desired performance of other additives. However, many swelling inhibitors will react with other drilling fluid components, resulting in severe flocculation or precipitation.

Second, current drilling fluid components must be environmentally acceptable. As drilling operations impact on plant and animal life, drilling fluid additives should have low toxicity levels and should be easy to handle and to use to minimize the dangers of environmental pollution and harm to personnel. Moreover, in the oil and gas industry today, it is desirable that additives work both onshore and offshore and in fresh and salt water environments.

SUMMARY

In one aspect, embodiments disclosed herein relate to a composition comprising an aqueous based continuous phase, and a functionally effective concentration of the additive formed from the following reaction of a tertiary amine of the following general formula:

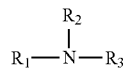

wherein $R_1$ and $R_2$ are alkyl or hydroxyalkyl groups with one to three carbon atoms or combinations thereof, and $R_3$ is a hydroxyalkyl group with one to three carbon atoms, with a compound of the following general formula:

R-A wherein R is an alkyl radical with one to three carbon atoms, and A is an organic or inorganic anion selected from the group consisting of sulfate, phosphate, carbonate, and combinations thereof.

In another aspect, embodiments disclosed herein relate to a method of reducing the swelling of clay in well comprising circulating in the well a water-based fluid comprising a functionally effective concentration of the additive formed from the following reaction of a tertiary amine of the following general formula:

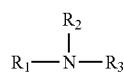

wherein $R_1$ and $R_2$ are alkyl or hydroxyalkyl groups with one to three carbon atoms or combinations thereof, and $R_3$ is a hydroxyalkyl group with one to three carbon atoms, with an alkylating agent of the following general formula:

R-A wherein R is an alkyl radical with one to three carbon atoms, and A is an organic or inorganic anion selected from the group consisting of sulfate, phosphate, carbonate, and combinations thereof.

In another aspect, embodiments disclosed herein relate to a method of decreasing the toxicity of a water-based fluid comprising an effective concentration of the additive formed from the following reaction of a tertiary amine of the following general formula:

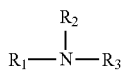

wherein $R_1$ and $R_2$ are alkyl or hydroxyalkyl groups with one to three carbon atoms or combinations thereof, and $R_3$ is a hydroxyalkyl group with one to three carbon atoms, with an alkylating agent of the following general formula:

R-A wherein R is an alkyl radical with one to three carbon atoms, and A is an organic or inorganic anion selected from the group consisting of sulfate, phosphate, carbonate, and combinations thereof.

Other aspects and advantages of the invention will be apparent from the following description and the appended claims.

DETAILED DESCRIPTION

The present invention comprises drilling fluid additives for reducing the downhole problems associated with clays which swell in the presence of water. A particular advantage of the additives of the present invention is their low toxicity and their compatibility with common anionic drilling fluid components.

Generally, the additives of the invention are monoquaternary hydroxyalkylalkylamines or poly(trihydroxyalkylalkylquaternary amines). Particularly preferred compounds of one embodiment of this invention are those which are obtained by reacting the compounds according to the following general reaction:

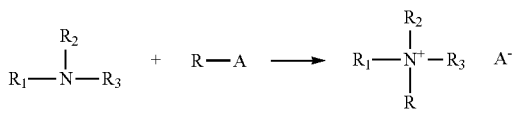

wherein $R_1$ and $R_2$ are alkyl or hydroxyalkyl groups with one to three carbon atoms or combinations thereof, $R_3$ is a hydroxyalkyl group with one to three carbon atoms, R is an alkyl radical with one to three carbon atoms, and A is an organic or inorganic anion selected from the group consisting of sulfate, phosphate, carbonate, and combinations thereof. Preferred tertiary amines are triethanolamine, diethanol/methylamine, trimethanolamine, dimethanol/methylamine, tripropanolamine, and dipropanolmethylamine. Preferred resulting quaternary amines are the products resulting from the reaction of triethanolamine and dimethyl sulfate, the product being quaternary triethanolaminemethyl methyl sulfate; and the reaction of dimethylethanolamine and dimethyl sulfate, the product being quaternary trimethylethanolamine methly sulfate. The methods of synthesis are well known to those who are skilled in the art.

Quaternary amines are generically referred to as quaternary ammonium compounds. Specific information on the formulation and synthesis of quaternary amines and related materials is found in Kirk-Othmer, Encyclopedia of Chemical Technology, third edition, volume 19, pages 521-531. Additional information is found in L. D. Metcalfe, R. J. Martin, and A. A. Schmitz, J. Am. Oil Chemical Society, 43, 355 (1966).

Quaternary ammonium compounds are tetrasubstituted ammonium salts. In all cases, the nitrogen atom is in the positively charged portion of the molecule.

The methods of preparation of quaternary ammonium compounds are many and varied, depending on the structure desired for the final compound. The most convenient reaction is one in which a suitable tertiary amine reacts with an alkylating agent, which can be a dialkyl sulfate. There are many variations in the final product because of the large number of diverse starting amines and salts.

Quaternary ammonium compounds are usually prepared in stainless steel or glass-lined equipment. The amine and solvent, e.g., isopropyl alcohol, water, or both, are loaded into the reactor and heated to the proper temperature, and then the alkylating reagent is added. Quaternization of tertiary amines with dialkyl sulfates is bimolecular. The rate of reaction is influenced by a number of factors, including basicity of the amine, steric effects, reactivity of the alkylating agent, and the polarity of the solvent. Polar solvents promote the reactions by stabilizing the ionic intermediates and products.

Methods of preparing quaternary amines are well known to those having ordinary skill in the art. In general, effective quaternary amines can be formed by heating the hydroxyalkylamine and dialkyl sulfate, or other water soluble quaternary amine compound. The reactants are heated until the reaction is completed. Generally, the reaction is complete when the tertiary amine value is approximately zero. This point can be determined by appropriate analytical techniques.

In some embodiments, the additives of the present invention are added to a water-based wellbore fluid in concentrations sufficient to deal with the clay swelling problems at hand. In some embodiments, concentrations between about 0.1 pounds per barrel (ppb) and 30 ppb are preferred; in other embodiments, concentrations between about 0.1 and 20 ppb are preferred; and in yet other embodiments, concentrations between about 0.1 pounds per barrel (ppb) and 10 ppb are preferred. While these concentrations are generally contemplated and are considered to be functionally effective, in some situations, much higher concentrations might be desirable for controlling swelling clays in underground formations.

Toxicity

When determining toxicity of materials used in conjunction with offshore drilling and production activities, Canada requires that the proposed materials undergo the Microtox® acute toxicity test. The Microtox® acute toxicity test operates on the basis of monitoring the level of light emission from luminescent bacteria. Luminescent bacteria produce light as a by-product of their cellular respiration. Exposure to toxic conditions result in a decrease in the rate of respiration, thereby reducing the rate of luminescence. Consequently, toxicity is measured as a percentage of luminescence lost. The test endpoint is measured as the effective concentration (EC) of a test sample that reduces light emission by a specific amount under defined conditions of time and temperature.

Generally, the effective concentration is expressed as $EC_{50}$ (15), which is the effective concentration of a sample which reduces light emission by 50% at 15 minutes at 15° C. One of skill in the art will appreciate that the length of time of exposure, and the minimum $EC_{50}$ values, will vary depending on local legislation. In some embodiments, the additives of the present invention are added to a water-based wellbore fluid in concentrations resulting in $EC_{50}(15)$ values greater than 50%; in other embodiments, $EC_{50}(15)$ values greater than 70%; and in yet other embodiments, $EC_{50}(15)$ values greater than 90%.

It is essential that the drilling fluid ultimately selected and formulated for use in any particular well application be appropriate for the conditions of the well. Therefore, although the base ingredients remain the same, i.e., salt or fresh water and the drilling fluid additives of this invention, other components can be added.

Specifically, materials generically referred to as gelling materials, thinners, fluid loss control agents, and weight materials are typically added to water base drilling fluid formulations. Of these additional materials, each can be added to the formulation in a concentration as rheologically and functionally required by drilling conditions. Typical gelling materials used in aqueous based drilling fluids are bentonite, sepiolite, and attapulgite clays and anionic high-molecular weight, water-soluble polymers such as partially hydrolyzed polyacrylamides.

An important aspect of the present invention is the presence of a weight material in the drilling fluid. Materials that have demonstrated utility as weight materials include Galena (PbS), Hematite ($Fe_2O_3$), Magnetite ($Fe_3O_4$), iron oxide ($Fe_2O_3$) (manufactured), Illmenite ($FeO.TiO_2$), Barite ($BASO_4$), Siderite ($FeCO_3$), Celestite ($SrSO_4$), Dolomite ($CaCO_3MgCO_3$), and Calcite ($CaCO_3$). The weight material is added to the drilling fluid in a functionally effective amount largely dependent on the nature of the formation being drilled. Weight materials are typically present only in drilling fluids and are not generally found in well treatment and stimulation fluids such as fracturing fluids. In fracturing fluids the use of weight materials is specifically avoided for functional reasons.

Similarly, it has been found beneficial to add lignosulfonates as thinners for water-base drilling fluids. Typically lignosulfonates, modified lignosulfonates, polyphosphates and tannins are added. In other embodiments, low molecular weight polyacrylates can also be added as thinners. Thinners are added to a drilling fluid to reduce flow resistance and control gelation tendencies. Other functions performed by thinners include reducing filtration and cake thickness, counteracting the effects of salts, minimizing the effects of water on the formations drilled, emulsifying oil in water, and stabilizing mud properties at elevated temperatures.

As mentioned previously, the drilling fluid composition of this invention contains a weight material. The quantity depends upon the desired density of the final composition. The most preferred weight materials include, but are not limited to, barite, hematite calcium carbonate, magnesium carbonate and the like.

Finally, anionic fluid loss control agents such as modified lignite, polymers, modified starches and modified celluloses can be added to the water base drilling fluid system of this invention.

As indicated, the additives of the invention are selected to have low toxicity and to be compatible with common anionic drilling fluid additives such as polyanionic carboxymethylcellulose (PAC or CMC), polyacrylates, partially-hydrolyzed polyacrylamides (PHPA), lignosulfonates, xanthan gum, etc.

Several preferred embodiments of the invention were prepared for use in the following examples. The several samples of condensates were prepared using various catalysts, as noted.

EXAMPLES

The following examples are included to demonstrate preferred embodiments of the claimed subject matter. It should be appreciated by those of skill in the art that the techniques disclosed in the examples which follow represent techniques discovered by the inventors to function well in the practice of the claimed subject matter, and thus can be considered to constitute preferred modes for its practice. However, those of skill in the art should, in light of the present disclosure, appreciate that many changes can be made in the specific embodiments which are disclosed and still obtain a like or similar result without departing from the scope of the claimed subject matter.

Example 1

The drilling muds in Table 1 are formulated to illustrate the claimed subject matter.

TABLE 1

|  | A (ppb) | B (ppb) | C (ppb) |
|---|---|---|---|
| Fresh Water | 285.0 | 285.0 | 285.0 |
| DuoVis | 1.0 | 1.0 | 1.0 |
| Chinese Starch HECMS | 3.0 | 3.0 | 3.0 |
| UltraCap | 2.0 | 2.0 | 2.0 |
| Triethylamine dimethyl sulfate | 10.5 | — | — |
| Triethylamine methyl chloride | — | 10.5 | — |
| Potassium Sulfate | — | — | 10.5 |
| Barite | 175.0 | 175.0 | 175.0 |

In the above mud formulation the following commercially available compounds have been used in the formulation of the drilling fluid, but one of skill in the art should appreciate that other similar compounds may be used instead.

TABLE 2

| UltraCap | Cationic polyacrylamide availale from M-I LLC. |
|---|---|
| DuoVis | Natural polymeric viscosifier, such as xanthan gum, starches. |

The properties of the above muds are determined at 120° F. and detailed in Table 3:

TABLE 3

| Properties | A | B | C |
|---|---|---|---|
| Viscosity (cps) at | | | |
| 600 rpm | 154 | 116 | 110 |
| 300 rpm | 101 | 83 | 78 |
| 200 rpm | 74 | 68 | 67 |
| 100 rpm | 49 | 48 | 40 |
| 6 rpm | 8 | 12 | 10 |
| 3 rpm | 11 | 13 | 13 |
| Gels 10 min. (lb/100 ft$^2$) | 14 | 17 | 17 |
| PV (cp) | 53 | 33 | 32 |
| YP (lb/100 ft$^2$) | 48 | 50 | 46 |

Dispersion tests are run with Arne, Oxford, and London Clay cuttings by hot rolling 10 g of cuttings in a one-barrel equivalent of mud for 16 hours at 150° F. After hot rolling the remaining cuttings are screened using a 20 mesh screen and washed with 10% potassium chloride water, dried and weighed to obtain the percentage recovered. The results of this evaluation are given in Table 4.

TABLE 4

| (% cuttings recovered) | A | B | C |
|---|---|---|---|
| London Clay | 107 | 102 | 103 |

To further demonstrate the performance of the drilling fluids formulated in accordance with the teachings of this invention, a test using a bulk hardness tester is conducted. A BP Bulk Hardness Tester is a device designed to give an assessment of the hardness of shale cuttings exposed to drilling fluids, which in turn can be related to the inhibiting properties of the drilling fluid being evaluated. In this test, shale cuttings are hot rolled in the test drilling fluid at 150° F. for 16 hours. Shale cuttings are screened and then placed into a BP Bulk Hardness Tester. The equipment is closed and using a torque wrench the force used to extrude the cuttings through a plate with holes in it is recorded. Depending on the hydration state and hardness of the cuttings and the drilling fluid used, a plateau region in torque is reached as extrusion of the cuttings begins to take place. Alternatively, the torque may continue to rise which tends to occur with harder cutting samples. Therefore, the higher the torque number obtained, the more inhibitive the drilling fluid system is considered. Illustrative data obtained using the three different mud formulations with three different cuttings are given in Table 5.

TABLE 5

| London Clay | Bulk Hardness: (values in inch/lbs) Mud Formulation | | |
|---|---|---|---|
| Turn No. | A | B | C |
| 6 | 10 | 10 | 5 |
| 7 | 10 | 10 | 10 |
| 8 | 20 | 20 | 20 |
| 9 | 50 | 40 | 50 |
| 10 | 95 | 55 | 95 |
| 11 | 125 | 70 | 135 |
| 12 | 145 | 70 | 165 |
| 13 | 150 | 90 | 190 |
| 14 | 225 | 105 | 225 |

The bentonite inhibition test was conducted to demonstrate the maximum amount of API bentonite that can be inhibited by a single 10 pounds per barrel (ppb) treatment of various shale inhibitors. This test procedure uses pint jars that are filled with one barrel equivalent of tap water and about 10 ppb of a shale inhibitor. Tap water was used as a control sample. All samples were adjusted to at least a pH of 9 and treated with about 50 ppb, 60 ppb, and 70 ppb portions of M-I GEL (bentonite) at a medium shear rate. After stirring the samples for about 30 minutes, the rheologies were measured and then the samples were heat aged overnight at about 150° F. After the samples were cooled the rheologies were measured and recorded. This procedure was carried out for each sample until all of the samples were too thick to measure. Tables 6-8 present data illustrating the shale inhibition effects of the addition of bentonite in tap water treated with various inhibitors of present invention.

TABLE 6

Rheology after hot rolled at 150° F. With 50 ppb Bentonite

| | Base Mud | A (Triethylamine Dimethyl Sulfate) | B (Triethylamine Methyl Chloride) | Triethylamine Diethyl Sulfate | Potassium Chloride |
|---|---|---|---|---|---|
| Viscosity (cps) at 3 rpm | 300 | 2 | 2 | 4 | 12 |
| 10' Gel | Too thick to measure | 3 | 2 | 7 | 26 |
| YP | Too thick to measure | 4 | 4 | 6 | 9 |

TABLE 7

Rheology after hot rolled at 150° F. With 60 ppb Bentonite

| | Base Mud | A (Triethylamine Dimethyl Sulfate) | B (Triethylamine Methyl Chloride) | Triethylamine Diethyl Sulfate | Potassium Chloride |
|---|---|---|---|---|---|
| Viscosity (cps) at 3 rpm | 300 | 3 | 3 | 4 | 48 |
| 10' Gel | Too thick to measure | 4 | 4 | 9 | 63 |
| YP | Too thick to measure | 4 | 4 | 8 | 45 |

TABLE 8

| | Base Mud | A (Triethylamine Dimethyl Sulfate) | B (Triethylamine Methyl Chloride) | Triethylamine Diethyl Sulfate | Potassium Chloride |
|---|---|---|---|---|---|
| Viscosity (cps) at 3 rpm | Too thick to measure | 12 | 14 | 8 | 143 |
| 10' Gel | Too thick to measure | 17 | 18 | 14 | 300 |
| YP | Too thick to measure | 48 | 50 | 45 | 136 |

To further demonstrate the toxicity performance of the drilling fluids formulated in accordance with the teachings of this invention, the Microtox® acute toxicity test is conducted on the samples. The samples were prepared and tested as specified in the Standard Procedure for Microtox Analysis published by the Western Canada Microtox Users Committee. The $EC_{50}(15)$ was determined at 15° C. Table 6 details the $EC_{50}(15)$ results for the samples.

TABLE 9

| | A (Triethylamine Dimethyl Sulfate) | B (Triethylamine Methyl Chloride) | Triethylamine Diethyl Sulfate |
|---|---|---|---|
| $EC_{50}(15)$ | 92.16% | <70% | 100% |

Upon review of the data in Tables 6-9, one of skill in the art can see that triethylamine diethyl sulfate and triethylamine dimethyl sulfate provide good shale inhibiting characteristics as well as good toxicity results.

Upon review of the above data, one skilled in the art should observe that drilling fluids formulated according to the teachings of this invention prevent the hydration of various types of shale clays and thus are likely to provide good performance in drilling subterranean wells encountering such shale clays. Further, drilling fluids formulated according to the teachings of this invention reduce acute toxicity values.

While the compositions and methods of this claimed subject matter have been described in terms of preferred embodiments, it will be apparent to those of skill in the art that variations may be applied to the process described herein without departing from the concept and scope of the claimed subject matter. All such similar substitutes and modifications apparent to those skilled in the art are deemed to be within the scope and concept of the claimed subject matter as it is set out in the following claims.

What is claimed is:

1. A composition comprising:
    an aqueous based continuous phase;
    a functionally effective concentration of the additive formed from the following reaction of a tertiary amine of the following general formula:

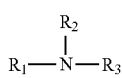

wherein $R_1$ and $R_2$ are alkyl or hydroxyalkyl groups with one to three carbon atoms or combinations thereof, and $R_3$ is a hydroxyalkyl group with one to three carbon atoms, with an alkylating agent of the following general formula:

R-A wherein R is an alkyl radical with one to three carbon atoms, and A is an organic or inorganic anion selected from the group consisting of sulfate, phosphate, carbonate, and combinations thereof; and
    a weighting wherein the weighting material is selected from the group consisting of galena, magnetite, illmenite, siderite, celestite, dolomite, barite, hematite, iron oxide, calcium carbonate and mixtures thereof.

2. The composition of claim 1 wherein the additive is the reaction product of a trihydroxyalkylamine and dimethyl sulfate.

3. The composition of claim 1 wherein the tertiary amine is selected from the group consisting of: triethanolamine, diethanolmethylamine, tripropanolamine, and dipropanolmethylamine.

4. The composition of claim 1 wherein the aqueous based continuous phase is selected from: fresh water, sea water, brine, mixtures of water and water soluble organic compounds and mixtures thereof.

5. The composition of claim 1 further comprising a viscosifying agent.

6. The composition of claim 1 further comprising an effective concentration of the additive such that the composition has an $EC_{50}(15)$ value greater than 50%.

7. The composition of claim 1 further comprising an effective concentration of the additive such that the composition has an $EC_{50}(15)$ value greater than 70%.

8. The composition of claim 1 further comprising an effective concentration of the additive such that the composition has an $EC_{50}(15)$ value greater than 90%.

9. The composition of claim 1 further comprising an effective concentration between about 0.1 ppb and 30 ppb.

10. The composition of claim 1 further comprising an effective concentration between about 0.1 ppb and 20 ppb.

11. The composition of claim 1 further comprising an effective concentration between about 0.1 ppb and 10 ppb.

* * * * *